United States Patent Office 3,243,715
Patented Mar. 29, 1966

3,243,715
TWO-GAS MASER OF IMPROVED EFFICIENCY
AND POWER LEVEL
Theodore A. Welton, Oak Ridge, Tenn., assignor to the United States of America as represented by the United States Atomic Energy Commission
No Drawing. Filed June 5, 1961, Ser. No. 115,048
5 Claims. (Cl. 330—4.3)

This invention relates to masers, and more especially to an improved electrically-excited two-gas maser of the type described by A. Javan in Phys. Rev. Letters 3, 87, and by Javan et al. in Phys. Rev. Letters 6, 106.

The optical maser can produce coherent energy in an extremely narrow line width, which can be propagated in a beam with a spreading angle determined only by diffraction. Thus, such devices are suitable for illumination or transmittal of energy for other purposes at a distance. The ruby maser is a solid state device which, though very simply operable, has inherent power handling limitations. A gas maser may comprise a simple cylindrical tube filled with the gas. The ends are parallel reflecting mirrors, one of which may contain an aperture or be thinly silvered to allow radiation to be transmitted out of the system. The gas may be excited by means of a D.C. discharge between electrodes therein, or by external electrodes disposed as rings near opposite ends of the tube, which electrodes are energized by radio-frequency energy as in conventional gas R-F discharges.

Maser operation at a given frequency depends upon achievement of an inverted population of two atomic states, transitions between which will yield light of the given frequency; that is, more atoms are in the higher of the two energy levels (emissive state) than are in the lower energy level where they absorb energy. That condition has been achieved in a helium-neon two-gas maser by exciting helium atoms with electrons in an electrical discharge and allowing the excited atoms to collide with atoms of neon, thus exciting the neon atoms to a state which is fairly close in energy to that of the excited helium atoms (about $17.1\mu^{-1}$). Maser action is achieved on the decay of the neon from the $2p^54s$ levels to the $2p^53p$ levels. The neon then decays further to the $2p^53s$ level, at which point it retains some 85% of its original energy in a form useless for maser operation.

This wasted energy contributes to the inherent inefficiency of the He–Ne system. Also, the difference between the excited levels of He and Ne, $0.0313\mu^{-1}$, is sufficiently great that the energy transfer cross section is undesirably small. In order to absorb all the available energy from the He, therefore, there must be a relatively large number of Ne atoms in the system because of the low cross section for energy transfer. Increased Ne concentration unfortunately increases the probability of direct electron excitation of the Ne, which excitation contributes to the inherent inefficiency of the system by increasing the population of unwanted excited states and the accompanying useless spontaneous radiation therefrom. Moreover, the He atoms, as indicated above, require an energy input of $17.1\mu^{-1}$ per atom by electrons, of which energy, only about $2.5\mu^{-1}$ at most can be recovered, so that the system is no more than 15% efficient at best.

According, it is a primary object of this invention to provide a two-gas maser of greatly improved efficiency. A further object of the invention is to produce a maser in which the physical requirements of the reflector system are considerably relaxed so that the device may be simpler and more rugged. An important object is to provide a maser which is capable of handling large amounts of power efficiently. Another object is to provide several alternative frequencies for maser operation in one system, including frequencies in the near infra-red region.

According to the invention, an electrical discharge is created in a gas mixture comprising (1) an inert gas, such as argon, for example, and (2a) magnesium and sodium or (2b) calcium and rubidium vapors disposed inside an optical resonator. The inert gas pressure is preferably substantially 1 mm. Hg, while the Mg(Ca) pressure is substantially $10^{-3}$ mm. Hg, which corresponds to the vapor pressure at about 500° C. The Na(Rb) pressure is adjusted to obtain substantially complete quenching of the Mg(Ca) resonance line with excitation of Na(Rb) atoms to their $5^2P(6^2P)$ levels, and is in the range $10^{-5}$–$10^{-7}$ mm. Hg. The singlet resonance line of Mg has a frequency of $3.5051\mu^{-1}$, while that of Ca has a frequency of $2.36523\mu^{-1}$. The $5^2P$ levels of Na are 3.5040 and $3.5043\mu^{-1}$ above ground, while $6^2P$ levels of Rb are 2.3793 and $2.3715\mu^{-1}$ above ground. The Mg and Ca resonance lines can be excited with very high efficiency in an electrical discharge, providing the inert gas–Mg(Ca) vapor ratio is correct. The sodium atoms may, for example, emit energy in transition downward to the $4^2S$ levels at frequencies 0.9300 and $0.9303\mu^{-1}$, thence downward to the $3^2P$ levels producing lines at 0.8784 and $0.8767\mu^{-1}$ frequencies, and thence to the ground ($3^2S$) state, producing lines at 1.6956 and $1.6973\mu^{-1}$ frequencies. An alternative route by way of the $3^2D$ levels will produce other useful frequencies. The Rb atoms may, for example, emit energy in transitions (a) downward to the $6^2S$ levels at frequencies of 2.7329 and $2.7921\mu^{-1}$, and thence downward to $5^2P$ levels at 1.3667 and $1.3237\mu^{-1}$, or (b) downward to the $4^2D$ levels at frequencies of 2.2534, 2.2937 and $2.2537\mu^{-1}$, thence downward to the $5^2P$ level at 1.5294, 1.5293 and $1.4757\mu^{-1}$. All these transitions are electric dipole transitions and possess good oscillator strengths. Moreover, all frequencies are in the range suitable for obtaining maser action. Simultaneous maser action can be obtained at many of the above wave lengths, so that a very large fraction of the input energy to the Mg atoms can be recovered as coherent radiation from the Na atoms. Maser action can be achieved in the infra-red region, producing a beam which can be readily used for signalling when modulated by a mechanical shutter, for example.

The optical resonator used with the gas system of this invention may be that described by Javan, for example, wherein a long quartz tube 1.5 cm. in diameter and 80 cm. long forms the gas chamber. At each end of the tube is a larger metal chamber containing high-reflectance Fabry-Perot plates spaced substantially 1 meter apart. Two optically flat windows allow the beam to leave opposite ends of the system. Flexible bellows in the end chambers allow external mechanical tuning of the plates. External electrodes to excite the discharge are energized by a conventional generator at 28 mc./sec. The reflectance of the plates in one of the desired wave length ranges may be made very high by evaporating successive layers of dielectric film on the flat surfaces of fused silica plates, although, for multiple wave length operation, simple silvered surfaces should be used. The gases producing maser action in this invention may also be used equally well in other resonator systems such as the mosaic resonator, or in the multistage optical amplifier.

The maser used with the system herein described need not be so elaborate, however, because of the superior properties of the gas combination. A metal tube may replace the quartz. The metal tube may have conventional fins or other cooling aids if high powers are used. The mirrors need not be made to such high reflectance and narrow frequency bandwidth, since with the improved efficiency of the system, more losses can be tolerated in the mirrors. A broader bandwidth for reflectance is in fact to be desired, so mirror requirements are considerably eased, when simultaneous operation at more than one frequency is contemplated. All the frequencies to be used should be above equally reflected by the mirrors in such case.

The system of this invention has at least seven advantages over that of the prior art, most of which lead to higher efficiencies of conversion from electrical power input to coherent light output, or to larger useful output from a device of given size.

(1) The energy coincidence is much closer ($0.0008\mu^{-1}$, 0.0063 and $0.0141\mu^{-1}$ instead of $0.0313\mu^{-1}$). The probability of transfer of excitation from Mg to Na atoms and from Ca to Rb is therefore much enhanced.

(2) The excited states of Mg, Ca, Rb and Na are joined to the ground states by optically allowed transitions, the Mg and Ca transitions having an oscillator strength close to unity. This again acts to increase the probability of transfer of excitation.

(3) The excited state of Mg or Ca can be populated with high efficiency by electron impact, because of the large oscillator strength for the transition from the ground state. This operates to make the upward transition very probable, and at the same time prevents the downward transition by trapping of resonance radiation within the gas.

(4) Of the $3.5051\mu^{-1}$ energy input required to excite a magnesium atom, and the $2.3652\mu^{-1}$ energy required to excite a calcium atom, at least one-half (and probably a larger fraction) can be recovered as coherent radiation from the sodium, while about 47–49% can be recovered from the rubidium.

(5) Because of higher efficiency, the device can be made more rugged and less costly.

(6) Coherent light can not only be obtained at a lower cost in electrical energy, but also at a lower cost in equipment. This is so because the equipment needs to dissipate less waste energy for given power output and can therefore be made smaller.

(7) A large number of wave lengths of coherent light can be produced, so that light can be chosen more flexibly for a given purpose.

Several factors must be considered in determining operable pressure of the gases. While the statements will be made for Mg–Na, the same statements apply to the Ca–Rb system, references to which are omitted only for simplicity. The Mg pressure should be chosen to optimize the probability of exciting the Mg atoms to the excited state by electron collision. It is known that magnesium vapor arcs with the above desirable characteristics can be operated at magnesium pressures of about 1 micron. Those arcs contain a rare gas, such as argon, to lengthen the electron path by scattering. At a vapor pressure of .001 mm. Hg, the temperature will be approximately 500–600° C. Quartz or metal resonators can operate without undue difficulty at that temperature. To obtain efficient quenching by the Na atoms, the partial pressure of the Na must be high enough to make the lifetime of an excited Mg atom before a quenching collision approximately equal to the trapping lifetime of the resonance radiation within the Mg vapor, which may be about $10^{-3}$ seconds for a resonator of reasonable dimensions. Yet the Na pressure must be much lower than the Mg pressure, to avoid creation of a Na arc which would defeat the purpose of the entire system. Lower pressure of the Na vapor is also advantageous in that the spontaneous emission from the excited Na atoms will be minimized. Fewer Na atoms are required to take up all the input energy that is available from the Mg because of the large cross section for transfer of energy above described. Pressures of about 0.01 to 0.0001 as large as the Mg pressure should fulfill all the above requirements.

Maser action can be obtained at several near infra-red frequencies available as the Na atoms cascade from the 5P level to the 3S level. 5P→4S yields two lines at wave lengths near 1.14 microns, and 4S→3P yields two lines at about 1.07 microns. Alternatively, 5P→3D yields 1.70 microns and 3D→3P yields about 0.82 microns. The large reservoir of 3S Na atoms will not prejudice the the efficiency of maser operation at the above wave lengths, about one-half the input excitation being recoverable from either of the above pairs of transitions, even though the transition from 3P to 3S (0.60 microns) may be less productive of useful energy. As compared with the maximum possible recovery of only about 15% from He–Ne, the systems described herein have an intrinsic efficiency of about 50%, without utilizing the ground state transition, which possibly could be added (with lower efficiency) if desired.

Calculations indicate that for a resonator 100 cm. long, the output power of this improved maser is about 250 watts as compared with the reported obtained performance of .015 watt in the He–Ne system of the prior art, operating, as it did, with a presumably less efficient set of transitions.

As has been heretofore noted, both of the mixtures disclosed, (1) Mg–Na–inert gas and (2) Ca–Rb–inert gas, exhibit uniquely the critical properties essential for high efficiency maser operation: (a) The energy discrepancy in the energy-transfer process is very much smaller than the mean thermal energy of the gas molecules at the operating temperature (about $400\mu^{-1}$), and (b) the transitions employed in both the first and second gases are solely the electrical dipole, optically allowed transitions. Helium as well as other inert gases may be used in place of the argon for most contemplated purposes without loss of efficiency.

Having thus described my invention, what is claimed is:

1. In a gas maser including a resonator provided with reflecting surfaces and means to excite an electrical discharge therein, means for increasing the efficiency and power output thereof utilizing simultaneous maser action at a plurality of frequencies comprising (1) a two-gas mixture consisting of a first gas which is energized to an excited state by said discharge and a second gas which is energized to an excited state by collision with said first gas, and (2) an inert gas which lengthens the electron path in said mixture, wherein said two-gas mixture comprises one of the following mixtures: the mixture calcium vapor as the first gas and rubidium vapor as the second gas, and the mixture magnesium vapor as the first gas and sodium vapor as the second gas.

2. The maser of claim 1 wherein said two-gas mixture is calcium vapor and rubidium vapor.

3. The maser of claim 1 wherein said two-gas mixture is magnesium vapor and sodium vapor.

4. The maser of claim 1 wherein the pressure of said first gas is from $10^{-2}$ to $10^{-3}$ mm. Hg, the pressure of said second gas is from $10^{-4}$ to $10^{-6}$ mm. Hg, and the pressure of said inert gas is substantially 1 mm. Hg.

5. The maser of claim 4 wherein said inert gas is argon.

(References on following page)

References Cited by the Examiner

UNITED STATES PATENTS

| | | | |
|---|---|---|---|
| 2,228,327 | 1/1941 | Spanner | 313—229 X |
| 2,929,922 | 3/1960 | Schawlow et al. | 324—0.5 |
| 2,955,262 | 10/1960 | Arditi | 324—0.5 |

OTHER REFERENCES

Wolff et al.: Electronics, vol. 34, page 31, Feb. 17, 1961.

Winans: Physical Review, vol. 30, No. 1, July 1927, pages 1 to 10, incl.

Winans et al.: Physical Review, vol. 52, No. 9, Nov. 1, 1937, pages 930 to 932 incl.

Javan: Quantum Electronics, edited by C. H. Townes, Columbia University Press, New York, 1960, pages 564 through 571.

ROY LAKE, *Primary Examiner.*

MAYNARD R. WILBUR, CHESTER L. JUSTUS,

*Examiners.*

D. HOSTETTER, *Assistant Examiner.*